(12) United States Patent
Hale et al.

(10) Patent No.: US 8,151,588 B2
(45) Date of Patent: Apr. 10, 2012

(54) APPARATUS AND METHOD FOR DISPLAYING AND DISPENSING FROZEN EDIBLE PRODUCTS

(75) Inventors: Michael John Hale, Sharnbrook (GB); Daniel Matthew Mayes, Sharnbrook (GB)

(73) Assignee: Conopco, Inc., Englewood Cliffs, NJ (US)

(*) Notice: Subject to any disclaimer, the term of this patent is extended or adjusted under 35 U.S.C. 154(b) by 579 days.

(21) Appl. No.: 12/321,070

(22) Filed: Jan. 15, 2009

(65) Prior Publication Data

US 2009/0183515 A1 Jul. 23, 2009

(30) Foreign Application Priority Data

Jan. 18, 2008 (EP) .................................. 08150419

(51) Int. Cl.
*A47F 3/04* (2006.01)
*F25D 11/02* (2006.01)
*F25D 3/08* (2006.01)

(52) U.S. Cl. ..................... 62/246; 62/441; 62/457.2

(58) Field of Classification Search .............. 62/62, 246, 62/430, 441, 457.2
See application file for complete search history.

(56) References Cited

U.S. PATENT DOCUMENTS

| 3,802,220 A | 4/1974 | Pompo | |
|---|---|---|---|
| 2007/0163290 A1* | 7/2007 | Shin et al. | 62/408 |

FOREIGN PATENT DOCUMENTS

| DE | 10233908 | | 2/2004 |
|---|---|---|---|
| FR | 2 228204 | | 11/1974 |
| FR | 2890727 | | 3/2007 |
| FR | 2890727 A1 | * | 3/2007 |
| FR | 2893706 | | 5/2007 |
| GB | 2403945 | | 1/2005 |
| GB | 2434432 | | 7/2007 |
| WO | WO 00/49349 | | 8/2000 |
| WO | WO 01/17362 | | 3/2001 |
| WO | WO 03/083386 | | 10/2003 |
| WO | WO 03083386 A1 | * | 10/2003 |
| WO | WO 2004/036128 | | 4/2004 |
| WO | WO 2006/007922 | | 1/2006 |
| WO | WO 2007/042162 | | 4/2007 |

OTHER PUBLICATIONS

European Search Report Application No. EP 08150419 completed Jun. 2, 2008.
"Safe at the Salad Bar", Food Safety Insights, May 2007.
International Search Report International Application No. PCT/EP2009/050305 mailed Apr. 15, 2009.

* cited by examiner

*Primary Examiner* — Chen Wen Jiang
(74) *Attorney, Agent, or Firm* — Gerard J. McGowan, Jr.

(57) ABSTRACT

An apparatus for displaying and dispensing frozen edible products is provided, comprising a chill cabinet inside which is situated an insulated container equipped with passive cooling means, and which contains one or more frozen edible products. A method for displaying and dispensing frozen edible products from the apparatus is also provided.

15 Claims, 5 Drawing Sheets

APPARATUS AND METHOD FOR DISPLAYING AND DISPENSING FROZEN EDIBLE PRODUCTS

FIELD OF THE INVENTION

The present invention relates to an apparatus and a method for displaying and dispensing frozen edible products in a catering or retail outlet.

BACKGROUND TO THE INVENTION

Selling frozen edible products, such as ice creams, sorbets, water ices, frozen milkshakes, granitas and the like, in quick service restaurants, institutional catering facilities, petrol stations and other outlets has always presented problems. Firstly, frozen products must be stored in freezer cabinets which, owing to their size, frequently cannot be located at the point of sale where the customer makes his decision with regards to buying or not buying a product. Secondly, products must be visible and accessible to serving staff and/or customers. If frozen products are not visible, customers are likely to choose a more readily accessible alternative, for example a chilled dessert such as yoghurt which is normally displayed in an open-fronted chill cabinet or a chocolate bar from an ambient display stand.

Counter-top freezers are available that allow frozen products to be presented to customers but these require connection to a power source and maintenance. They are also quite sizeable, due to the need to provide active refrigeration, whereas in catering environments space is usually a very scarce resource. On the other hand, insulated boxes combined with passive refrigeration (e.g. cooling blocks containing eutectics) for storing and preserving frozen products are known, for example from U.S. Pat. No. 3,802,220. WO 03/083386 discloses an insulated container having removable displaying and cooling means and containing frozen edible products. In operation, the insulated container, equipped with its displaying means and cooling means and filled with frozen edible products to be sold, is put on display at a point of sale, so that customers can chose and take products from said insulated container. However these insulated boxes and containers do not keep frozen products at sufficiently low temperatures for sufficiently long times. Thus there is a need for a new apparatus for displaying frozen products which does not require large amounts of space and which maintains the products at low temperatures for long times.

SUMMARY OF THE INVENTION

We have now found that it is possible to display frozen edible products for 6 hours or more with good visibility and accessibility whilst requiring minimal space in a catering/retail environment by locating an insulated box having passive cooling means inside a chill cabinet. Accordingly, in a first aspect the present invention provides an apparatus for displaying and dispensing frozen edible products comprising a chill cabinet inside which is situated an insulated container equipped with passive cooling means, and which contains one or more frozen edible products.

The invention allows frozen edible products to be displayed and dispensed in quick service restaurants, institutional catering facilities and other similar retail outlets. These outlets normally have front-of-house chill cabinets but have very little space for a freezer at the point of sale. The invention lies in the recognition that it is possible to take advantage of pre-existing facilities, i.e. chill cabinets/fridges provided that a suitable means of keeping the products frozen is also provided. Locating the insulating container equipped with passive cooling means inside a chill environment significantly extends the time for which the products are kept at an acceptable temperature (e.g., below about $-5°$ C. or $-10°$ C.) beyond that which can be achieved with the container located in an ambient environment. Display times of at least 6 hours, 12 hours or even longer, such as 24 hours can thus be achieved. The invention has the further advantage over counter-top freezers and stand-alone insulated boxes that the chill cabinet can contain both chill and frozen products, with the result that a single sales system is sold from and subsequently re-stocked, rather than two. Moreover, since the insulated container is located within a constant temperature environment, the lifetime of the passive cooling means is predictable, unlike for example in passively cooled insulated containers which are used in mobile selling situations (e.g. where sales persons sell frozen products to consumers by walking along beaches or through sports stadia etc). In the latter situation, the lifetime of the passive cooling means is highly dependent on the external temperature and the frequency of sales. This provides improved quality control, since the time for which the temperature in the insulated container is maintained below its maximum permitted value is predictable. Thus loss in quality of the frozen products resulting from too high temperatures is easily avoided.

Preferably the passive cooling means comprises a eutectic material, more preferably one having a eutectic temperature in the range $-5$ to $-25°$ C., even more preferably $-8$ to $-20°$ C.

Most preferably the passive cooling means is provided in the form of pre-frozen blocks containing the eutectic material. In a particularly preferred embodiment, the blocks can be removed from the insulated container without needing to remove the products from the container.

In one embodiment, the chill cabinet is provided with front and/or rear doors, and the insulated container is open at its front and/or rear ends, which abut the inside of the door(s). More preferably the open end(s) of the container are provided with seal(s).

In another embodiment, the chill cabinet is open and preferably at least part of the container is transparent so that the products are visible.

Preferably the insulated container is separated into two or more separate compartments. Preferably the apparatus is located in a restaurant, café, institutional catering facility, petrol station or other retail outlet.

Preferably the frozen edible products are ice cream, sorbet, frozen yoghurt, frozen milkshake or granita, or the like. More preferably the frozen edible products contain particles of ice or other frozen material having a size of greater than 0.25 mm.

In a second aspect, the present invention provides a method for displaying and dispensing frozen edible products from an apparatus according to the first aspect of the invention, the method comprising (in either order) the steps of:
  a) placing frozen edible products in the insulated container;
  b) situating the insulated container in the chill cabinet at the point of sale.

DETAILED DESCRIPTION OF THE INVENTION

The invention is further described with reference to the drawings wherein:
  FIG. 1 represents a view of a container according to the invention having closed ends.
  FIG. 2 represents a view of an open-fronted chill cabinet containing a container having three separate compartments.

Figure 1:
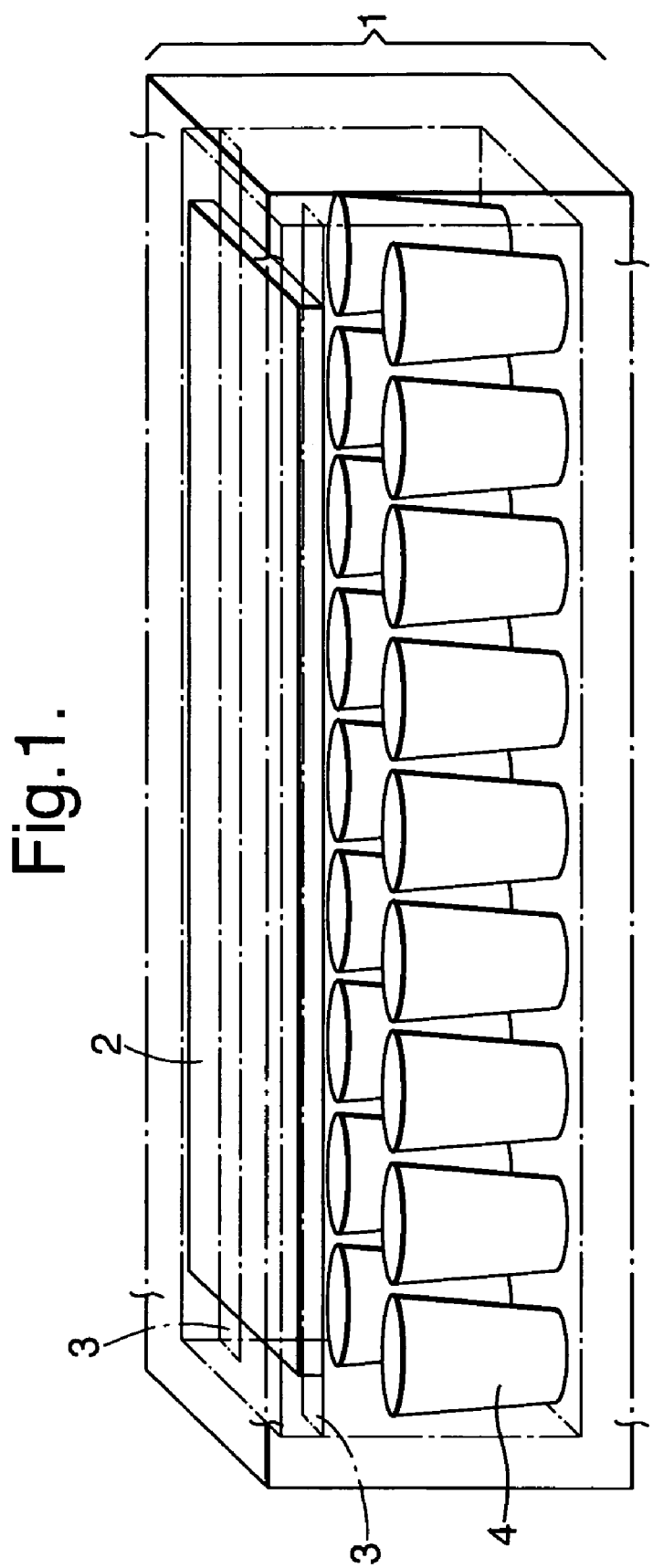

"Chill cabinet" means a cabinet or fridge which is maintained at an approximately constant temperature (typically in the range of 0° C. to +10° C., such as from +2° C. to +7° C.), by means of active cooling. Thus the term "chill cabinet" does not include cabinets which are cooled by passive means, such as eutectics.

"Insulated container" means a container having insulated walls which comprise a heat insulating material having a thermal conductivity in the range of 0.5 to 50 mWm$^{-1}$K$^{-1}$. Typically, the container is of generally cuboid shape, having 6 sides, although other shapes and configurations are possible, such as containers with 5 or 4 sides as described below. The insulated walls may be constructed from an insulating material encased between sheets of a material such as fibreglass or plastic. The insulating material can be, for example, a closed cell foam structure such as expanded polystyrene; foam rubber, such as elastomeric nitrile rubber insulation (which has a thermal conductivity of around 30 mW m$^{-1}$K$^{-1}$), rigid foams, such as polyurethane; a fibrous material, such as fibreglass; a vacuum sealed within a double walled container; or vacuum insulated panels, which are typically made of an open cell foam or granular structure which is enveloped and hermetically sealed into a gas-impervious film under very low pressure. These panels have a thermal conductivity of around 5 to 10 mW m$^{-1}$K$^{-1}$. Different insulating materials can be used to construct different parts of the container. The walls are usually 5-50 mm thick, typically about 25 mm.

The passive cooling means is preferably a phase change material with a thermal capacity of between 150 and 300 kJ/kg over a temperature range of −5 to −50° C. Preferably it is a eutectic material, i.e. a phase change material which changes phase (melts) over a narrow temperature range, such as less than 1 or 2° C., for example eutectics based on urea, sodium acetate or sodium chloride. The phase change material should have a phase change temperature such that the frozen edible product remains frozen and is at a suitable temperature when consumed, for example −5° C. or below, preferably, −8° C. or below.

When the cooling capacity of the passive cooling means is nearly exhausted, or at the end of a vending period, the passive cooling means are "recharged", for example by re-freezing in a back-of-house freezer facility. The time for which the passive cooling means are refrozen must be sufficient to remove the heat absorbed by the cooling blocks during a vending period. Typically they will be refrozen overnight. The phase change temperature should be above the temperature of a typical back-of-house refrigeration facility, so that it can be refrozen conveniently, e.g. overnight or while the outlet is closed. The back of house refrigeration facility is typically a freezer or cold store at a temperature in the range −18 to −25° C. Thus the phase change temperature is preferably −25° C. or above, more preferably −20° C. or above, such as about −10 to −15° C.

The phase change material may be provided in the form of blocks comprising a hollow casing containing the passive cooling means. The casing may be any suitable material, such as fibreglass or plastic. The casings are typically not completely filled with the phase change material when unfrozen, so that there is space inside the casings to allow for expansion of the phase change material on freezing. The phase change material generally does not make the products colder (since the products and phase change material may well be at the same initial temperature, i.e. that of the back-of-house freezer), but prevents the products from warming up.

Preferably blocks containing the phase change material are located on each of the inside surfaces of the container since this configuration is the most effective for maintaining low temperatures inside the container. If it is desired to minimise the amount of phase change material, the most effective location for a single block in order to maintain low temperatures is on the inside of the upper surface of the container. The blocks and products may be stacked, e.g. a block is placed on the bottom of the container, then a layer of products is placed on the block, then another block on top of the products, then a second layer of products and finally a third block on top near the upper surface of the container.

Preferably, the blocks are removable from the insulated container. More preferably, the blocks can be removed without having to remove frozen products from the container. Thus the container and products may remain in place at the point of sale while the cooling blocks are removed for refreezing and replaced with frozen ones. This allows the frozen products to be held inside the insulated container continuously for long times, e.g. for several days.

The container containing the frozen products and equipped with the passive cooling means is situated in a chill cabinet at a point of sale. The frozen products are then available to be dispensed during a vending period. Depending on the throughput of the outlet, it may be appropriate to replace the products without replacing the passive cooling means, i.e. if the number of products sold is high so that the products are sold before the cooling capacity is exhausted, or to replace the passive cooling means, i.e. if the number of products sold is lower so that the cooling capacity is exhausted before all the products are sold.

A 6, 12 or 24 hour display time fits conveniently into sales patterns and shift operations in a quick service restaurant, which is typically open for 12 to 18 hours per day. Cooling blocks can be brought out from the back-of-house freezer to the point of sale at the start of the vending period and need only be replaced once or twice per day, thus requiring minimal time and effort from the operator.

The thickness of the insulating material and the amount and nature of the phase change material depend on a number of factors, including the size and number of products in the tray, the temperature of the environment in which the apparatus is placed, and the time for which the frozen products are required to be kept in the apparatus. Heat load analysis may be employed in order to predict the thickness of the insulating material and the amount and nature of the passive cooling means required.

A thermometer for measuring the temperature of the cooling blocks and/or products, together with a display or alarm, may be included in the apparatus so that an operator can ensure that the temperature does not go above a pre-determined upper limit (for example −5° C.). Similarly, a timer alarm may be included to ensure that the apparatus is used for a certain period of time before the cooling blocks are replaced or re-frozen.

The container may be constructed from two (or more) parts which fit together and which can slide relative to each other so that the length of the container can be varied to suit differently sized chill cabinets.

In one embodiment, the insulated container is closed, for example it is cuboid with a base, four walls and a lid. The front wall is openable to allow access to the products. FIG. 1 is a cut-away view of a container of this embodiment with the front wall and lid not shown so that the inside of the container is visible. The insulated container 1 contains passive cooling means comprising a eutectic block 2 which is supported on rails 3 just below the lid and above the products 4. This type of container is particularly suitable for open-fronted chill cabinets. Such cabinets are often ventilated, so that there is a constant flow of air across the top of products inside the cabinet. While this airflow is beneficial for keeping products at chill temperatures, it can result in increased heat transfer to objects at frozen temperatures. The openable front wall minimizes heat transfer whilst still providing good access to the products. Preferably at least part of the front wall, or other walls, is transparent so that the products are visible. However, it is also possible that the walls are not transparent, so that the products are not visible until the container is opened. In this case, images of the products are shown on the outside of the container so that it is clear to consumers that the products are inside. Thus in this case the products themselves are not displayed. Nonetheless, the container achieves the function of displaying the products by means of the images.

Figure 2:
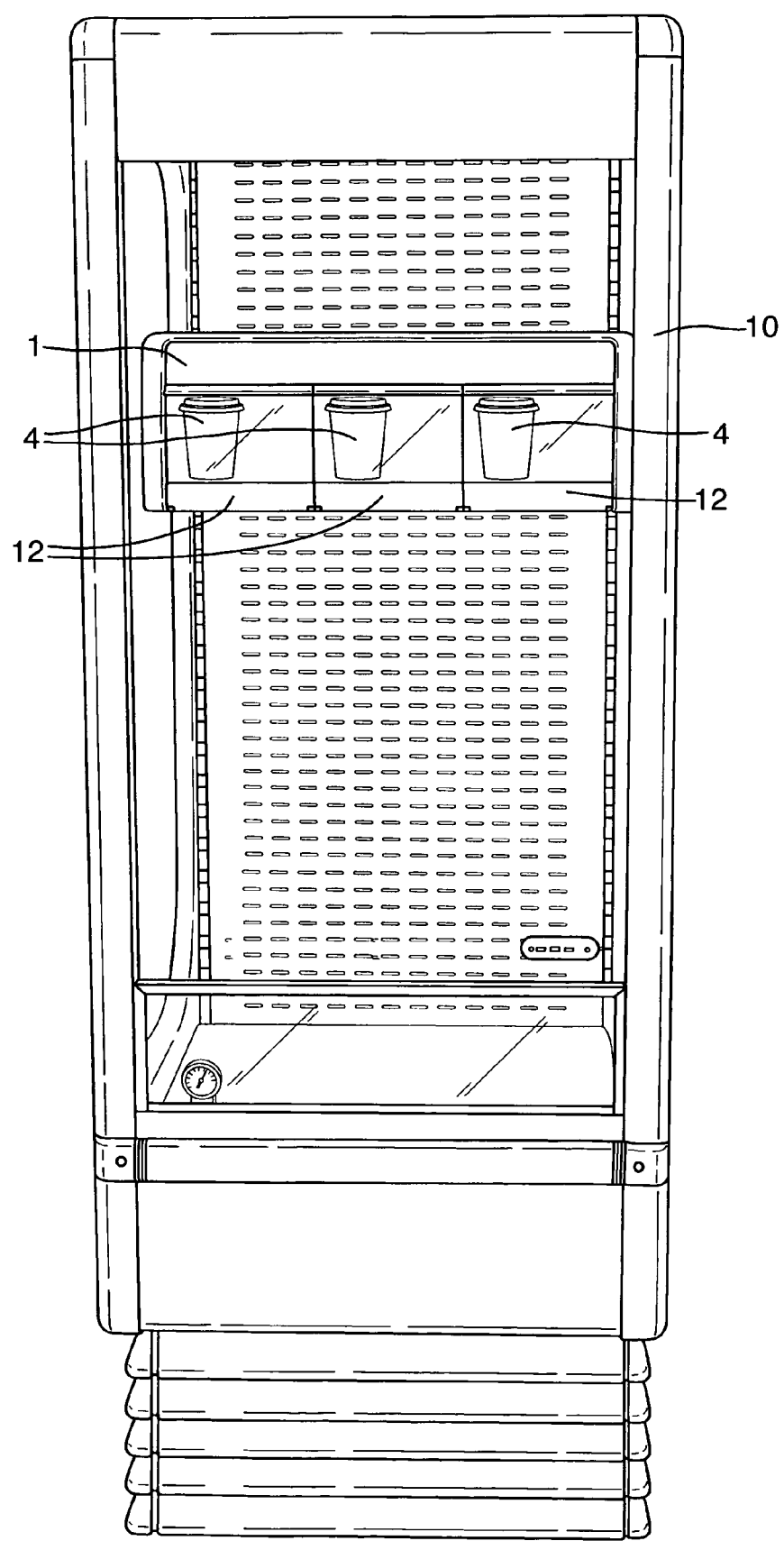
Figure 3:
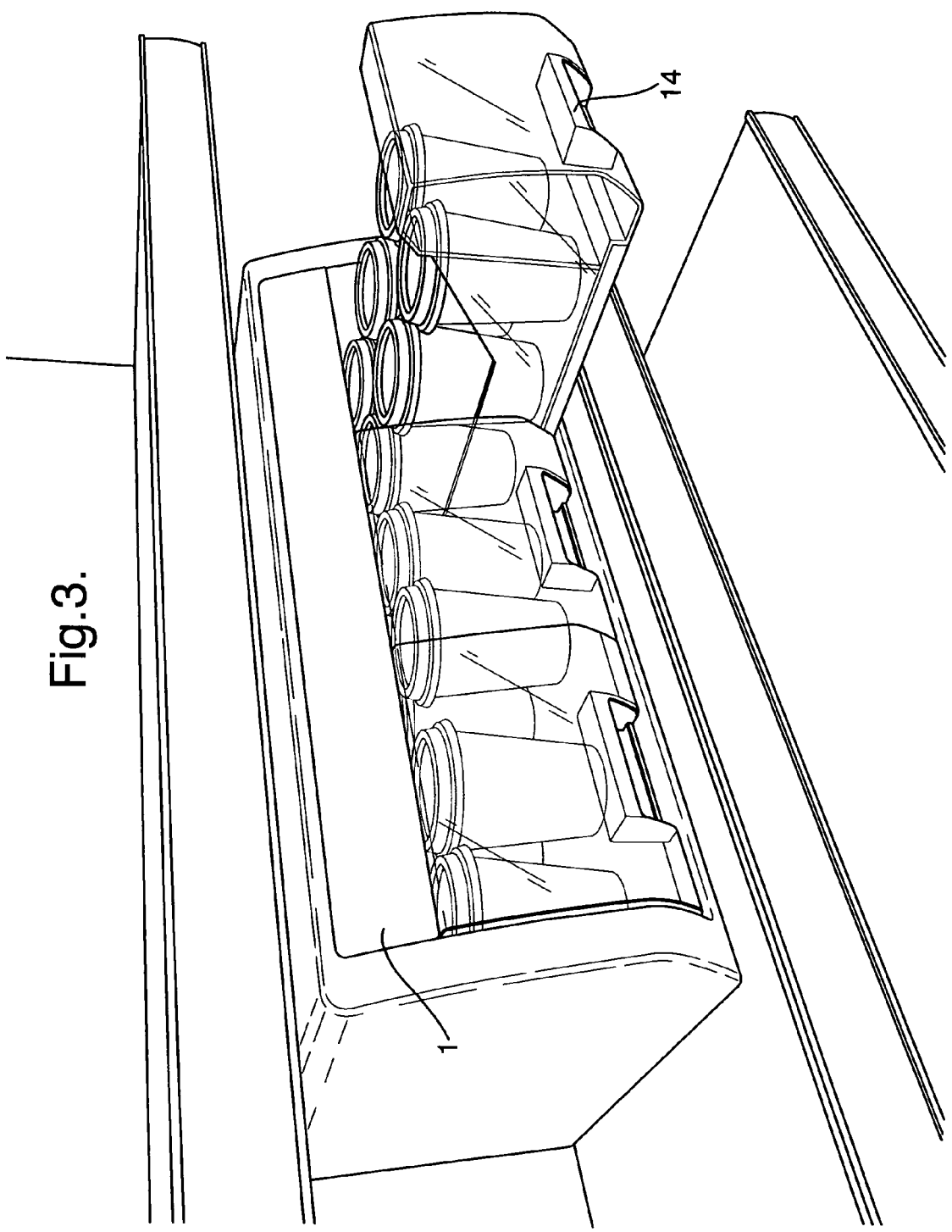
FIG. 3 represents a view of a container having drawer compartments.

FIG. 2 represents a view of an open-fronted chill cabinet 10 containing a container 1 having three separate compartments 12. Different types or flavours of product 4 may be present in each compartment. Each compartment may be opened independently of the others, for example where the front wall comprises a number of doors. Having separate compartments minimizes the heat flow into the other compartments when one compartment is opened, and thereby helps to maintain the required low temperature for long times. The compartments may conveniently be formed as drawers 14 which can be slid forward in order to access the products as shown in FIG. 3.

Figure 4:
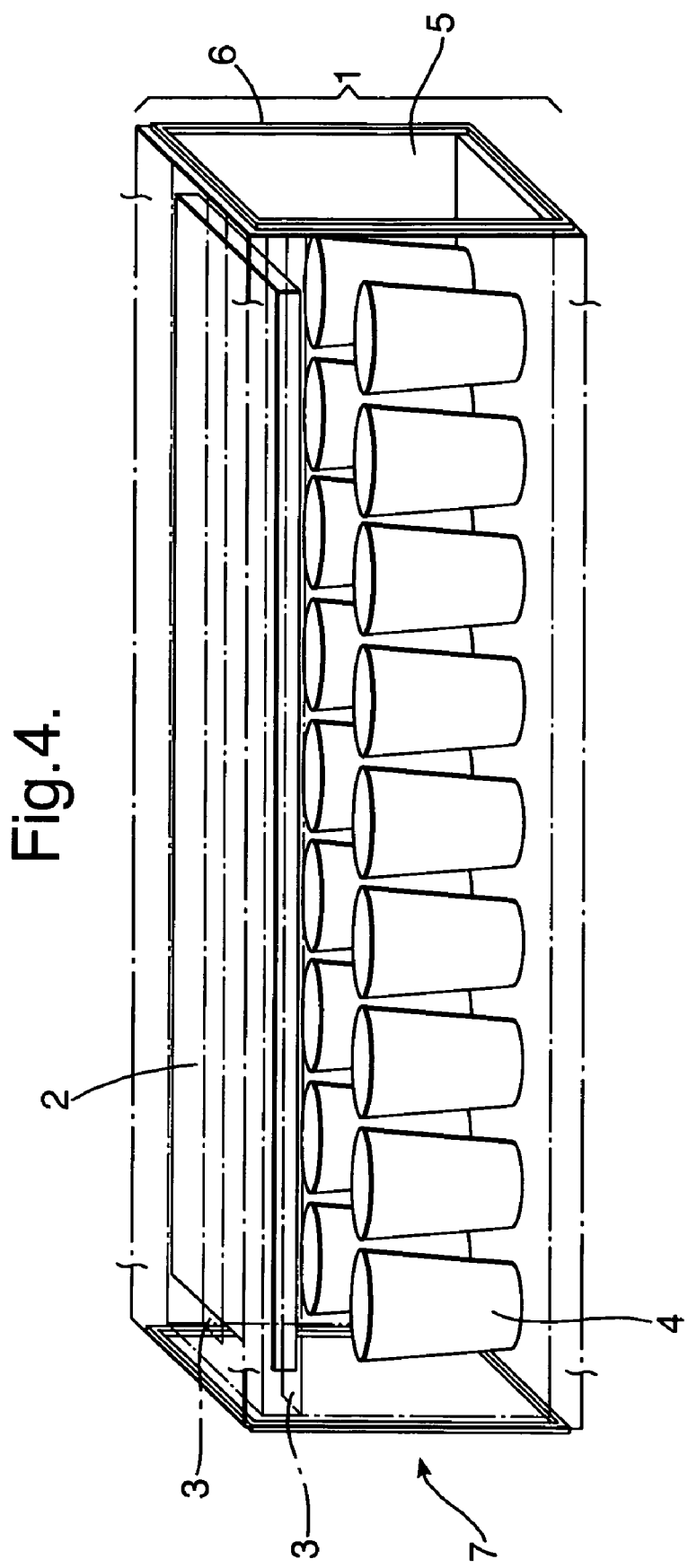
FIG. 4 represents a view of a container having open ends.
Figure 5:
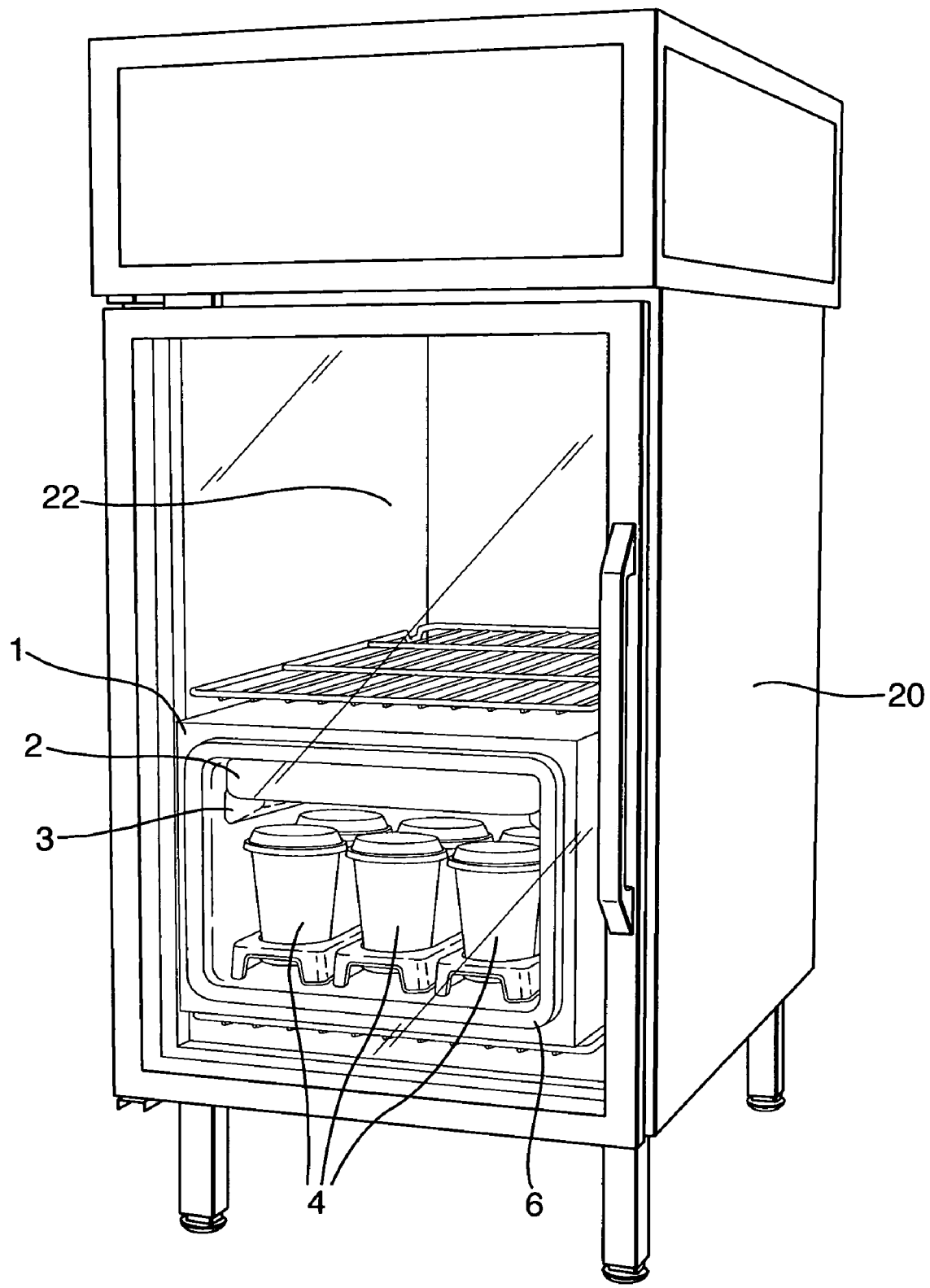
FIG. 5 represents a view of a chill cabinet having a glass front door containing a container having an open end.

Many chill cabinets have a door, which is usually transparent so that the products inside the chill cabinet are visible, and a number of shelves on which products are placed. In an embodiment especially suited for this type of chill cabinet, the insulated container is open at the end adjacent to the door. The container substantially occupies the whole of a shelf so that the open end abuts the inside of the door. FIG. 4 is a cut-away view of a container of this embodiment. As in FIG. 1, the insulated container 1 contains passive cooling means comprising a eutectic block 2 which is supported on rails 3 just below the lid and above the products 4. The end of the container 5 adjacent to the door is open and is preferably provided with a seal 6, for example a rubber or foam gasket, so that when the cabinet door is shut, it also closes the open end of the container, so that air cannot flow between the container and the rest of the chill cabinet whilst the products in the container remain visible. FIG. 5 shows a chill cabinet 20 having a glass front door 22 containing a container having an open end. The seal 6 abuts the glass door 22.

Some chill cabinets also have back doors through which products can be restocked, ensuring that stock is rotated. Thus, the insulated box may be open at the rear. In the same way as described above, the rear open end 7 abuts the back door and a seal is provided to prevent air exchange between the container and the cabinet when the rear door is closed. In one embodiment particularly suitable for cabinets which have both front and rear doors, both the front and rear ends of the insulated container are open. The container or shelf may be sloped from the rear to the front so that products are fed to the front of the container by gravity.

The embodiments having one or both ends open have the further advantage that more products can be accommodated in the container since the space on the shelf that would otherwise be occupied by the insulating end walls is available. Preferably there is a gap between the container and the side walls of the cabinet, and also between the base and top of the container and the shelves of the cabinet, since this ensures that the outside of the container is at chill temperature.

"Frozen edible product" means a product designed for consumption which contains ice, and thus includes "drinkable" frozen products such as frozen milkshakes and granitas as well as ice creams, sorbets, frozen yoghurts and the like. Frozen edible products may also comprise other components such as chocolate, nuts, fruit, biscuit, wafers and the like. The frozen edible product is normally a packaged product. Typically the products are tub or cup products, but may also be stick, bar or cone products.

We have found that certain types of frozen edible product are especially suitable for use in the apparatus of the invention. In particular we have found that granita/ice slush products which contain relatively large particles of ice (or other frozen material) perform well compared to typical ice cream products. Preferably the frozen edible product contains frozen particles having a size of greater than 0.25 mm, more preferably greater than 0.5 mm, most preferably about 1 mm or larger. In a preferred embodiment, the frozen particles consist essentially of ice. By "consist essentially of ice" it is meant that a small amount of solids may be present, so that, for example, the ice particles are flavoured or coloured. In this case the total solids content is less than 0.5 wt %, preferably less than 0.1 wt %. The frozen particles can also be made for example from fruit juice. The frozen particles can be produced from water or aqueous solutions in any suitable manner, for example by freezing drops on a drum freezer, by direct immersion of droplets in liquid nitrogen; or by using a fragmented ice maker such as a Ziegra Ice machine, optionally used with a device (such as a crushing pump) which allows for in-line control of the particle size, as described in WO 2006/007922. Frozen products are produced by combining the large frozen particles with another component such as a syrup, slush or ice cream, which may contain small ice crystals (e.g. 50-100 μm in size) produced in an ice cream freezer.

We have found that frozen edible products containing large ice particles are particularly suitable for use in the apparatus of the invention because they are suitable for consumption over a relatively wide temperature range, compared for example to a standard ice cream or ice lolly product. Thus they may be displayed in the apparatus for a long period of time whilst retaining their acceptability to consumers. At low temperatures, i.e. soon after they have been put on display, these products are solid and can be consumed by spooning. After they have been kept in the apparatus for several hours their temperature will have risen. Above about −6° C. normal ice creams begin to become unacceptably soft and runny; similarly ice lolly products become prone to falling off their sticks. In contrast, while products containing large ice particles change their properties as their temperature increases, this change does not result in them becoming unacceptable to consumers. As their temperature rises, the products become more-liquid like and may be consumed by sucking through a straw or by drinking (rather than by spooning), so that they become more like frozen milk-shakes or slush drinks. The initially large frozen particles become smaller as a result of melting, but are still perceptible on consumption. Thus these products retain their icy nature and acceptability.

The present invention will now be further described with reference to the following examples, which are illustrative only and non-limiting.

EXAMPLE 1

An insulated container having dimensions of 605 mm (length)×335 mm (width)×225 mm (height) was constructed from panels of 25 mm expanded polystyrene (nominal thermal conductivity of 35 mW m$^{-1}$K$^{-1}$). A block having dimensions 480 mm×280 mm×28 mm and containing 2 2 litres of eutectic solution with a mass of about 2.5 kg (supplied by Cool Sari) was placed inside the container just beneath the top panel, supported on plastic rails as shown in FIG. 1. The eutectic had a melting point of −12° C.

The container was filled with 18 200 ml products (described below in example 3C) at an initial temperature of −10° C. and placed in a chill cabinet at +3.1° C. The temperatures of four the products were measured by means of thermocouples placed at their centres. The products were found to remain below −5° C. for 31 hours. This demonstrates that the apparatus of the invention is capable of maintaining frozen products at acceptable temperatures for long periods of time.

EXAMPLE 2

An open-ended insulated container having dimensions of 605 mm (length)×335 mm (width)×225 mm (height) was constructed from four panels of 25 mm expanded polystyrene (nominal thermal conductivity of 35 mW m$^{-1}$K$^{-1}$). Two blocks having dimensions 480×280×28 mm and 265×162×30 mm containing 2.2 and 0.9 litres of eutectic solution respectively, were placed inside the container just beneath the top panel, supported on plastic rails as shown in FIG. 4. The eutectic was supplied by Cool Sari and had a melting point of −12° C.

The container was filled with 21 200 ml products (described below in example 3C) at an initial temperature of −10° C. and placed in a chill cabinet having a glass door and set at a temperature of +7° C. The trial was conducted over 55 hours, with three 7.5 hour simulated selling periods (at the start, middle and end) during which the cabinet door was opened and products were removed. The eutectic blocks were replaced after each selling period, and also at the start of the next selling period (i.e. the following morning). The products that had been removed were replaced at the end of each selling period. The temperatures of four the products were measured by means of thermocouples placed at their centres.

The products in the centre of the container remained below −6° C. for 55 hours and those nearest to the door were at about −4° C. at the end of the trial (in a real selling operation, the residence time of products at the front of the container would shorter as these would be the first to be sold). This demonstrates that the apparatus of the invention is capable of maintaining frozen products at acceptable temperatures for long periods of time.

EXAMPLE 3

Three different frozen products were made using the following formulation.

| Ingredient | Amount (g) |
| --- | --- |
| skimmed milk powder | 40.6 |
| whey powder | 30.6 |
| glucose syrup | 157 |
| dextrose liquid | 91.5 |
| coconut oil | 15.0 |
| guar gum | 1.0 |
| carrageenan | 2.1 |
| monodiglycerides | 2.1 |
| coffee powder | 7.1 |
| coffee paste (50/50 roasted coffee/coconut oil) | 24.9 |
| water | 628 |

Product A: a conventional soft ice cream product was produced by mixing all the above ingredients, pasteurizing and homogenizing the mix and then freezing and aerating in a standard ice cream freezer to an overrun of 100%.

Product B: a low overrun ice cream product was produced in the same way as A, except that the overrun was 5%.

Product C: a granita style product containing ice particles was produced by mixing the above ingredients, except that only 340 g of water was included. The mix was pasteurized and homogenized and then frozen in an ice cream freezer. The remaining 288 g of water was frozen to form large ice particles (approximately 5 mm in diameter). The ice particles were fed into the stream of partially frozen mix as it left the freezer using a fruit feeder. The resulting mixture was then passed through a size-reduction device so that the ice particles were ~1 mm in size. The product had an overrun of about 10%, due to incorporation of air as the ice particles are mixed in.

The products were filled into 200 ml containers and stored at −18° C. until used for testing. To test the suitability of these products for use in the apparatus of the invention, samples were equilibrated at a number of temperatures between −9.5 and −4.0° C. The acceptability of the products at each temperature was judged by a panel of tasters. The results were as follows:

| | A | B | C |
| --- | --- | --- | --- |
| −9.5° C. | Acceptable | Acceptable | Acceptable: spoonable, but not suckable |
| −8.5° C. | Acceptable | Acceptable | Acceptable: spoonable but barely suckable |
| −7.5° C. | Acceptable | Acceptable | Acceptable: spoonable and suckable |
| −6.7° C. | Acceptable, but becoming very soft. | Acceptable | Acceptable |
| −5.5° C. | Unacceptable: becoming liquid-like and lacking structure | Barely acceptable: becoming liquid-like and lacking structure | Very acceptable as a drinkable/suckable product |
| −5.0° C. | Unacceptable | Unacceptable: visible liquid separation | Acceptable |
| −4.6° C. | Unacceptable | Unacceptable | Acceptable: some ice still detectable |
| −4.0° C. | Not tested | Not tested | Just acceptable: little ice detectable |

All of the products had the same final formulation. B and C had similar overruns. Thus the different properties are solely due to the form of the ice in the products. In A and B, the ice crystals were small (<100 μm) since they were produced in the ice cream freezer. In C, a substantial amount of the ice was present in the form of large (~1 mm) particles. The results show that the product containing large ice particles (C) was acceptable at higher temperatures, corresponding to longer storage times, than the ones with the identical formulation but without large ice particles (A and B). Thus products with large ice particles are particularly suitable for use in the apparatus of the invention.

The various features and embodiments of the present invention, referred to in individual sections above apply, as appropriate, to other sections, mutatis mutandis. Consequently features specified in one section may be combined with features specified in other sections, as appropriate. Various modifications and variations of the described apparatus and methods of the invention will be apparent to those skilled in the art without departing from the scope of the invention.

Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the following claims.

The invention claimed is:

1. An apparatus for displaying and dispensing frozen edible products comprising a chill cabinet, which is maintained at an approximately constant temperature by means of active cooling, inside which is situated an insulated container equipped with passive cooling means, and which contains one or more frozen edible products.

2. An apparatus according to claim 1 wherein the passive cooling means is a eutectic material.

3. An apparatus according to claim 2 wherein the eutectic material has a eutectic temperature in the range −5 to −25° C.

4. An apparatus according to claim 2 wherein the passive cooling means is provided in the form of pre-frozen blocks containing the eutectic material.

5. An apparatus according to claim 4 wherein the blocks can be removed from the insulated container without needing to remove the products from the container.

6. An apparatus according to claim 1 wherein the chill cabinet is provided with front and/or rear doors, and the insulated container is open at its front and/or rear ends respectively, which abut the inside of the door(s).

7. An apparatus according to claim 6 wherein the open end(s) of the container are provided with seal(s).

8. An apparatus according to claim 1 wherein the chill cabinet is open and at least part of the container is transparent.

9. An apparatus according to claim 1 wherein the insulated container is separated into two or more separate compartments.

10. The apparatus according to claim 1 which is located in a restaurant, café, institutional catering facility, or petrol station.

11. The apparatus according to claim 1 wherein the frozen edible products are ice cream, sorbet, frozen yoghurt, frozen milkshake or granita.

12. An apparatus according to claim 11 wherein the frozen edible products contain frozen material having a size of greater than 0.25 mm.

13. The apparatus according to claim 12 wherein the frozen material comprises particles of ice having a size of greater than 0.25 mm.

14. A method for displaying and dispensing frozen edible products from an apparatus according to claim 1, the method comprising, in either order, the steps of:
 a) placing frozen edible products in the insulated container;
 b) situating the insulated container in the chill cabinet at the point of sale.

15. The apparatus according to claim 1 which is located in a retail outlet.

* * * * *